United States Patent
Na et al.

(10) Patent No.: US 9,236,621 B2
(45) Date of Patent: Jan. 12, 2016

(54) COOLING APPARATUS FOR FUEL CELL

(71) Applicants: Hyundai Motor Company, Seoul (KR); Kia Motors Corporation, Seoul (KR)

(72) Inventors: Sung Wook Na, Gyeonggi-do (KR); Chi Myung Kim, Gyeonggi-do (KR); Yong Sun Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 161 days.

(21) Appl. No.: 14/075,237

(22) Filed: Nov. 8, 2013

(65) Prior Publication Data

US 2014/0127600 A1    May 8, 2014

(30) Foreign Application Priority Data

Nov. 8, 2012    (KR) .......................... 10-2012-0126231

(51) Int. Cl.
*H01M 8/04* (2006.01)

(52) U.S. Cl.
CPC ...... *H01M 8/04029* (2013.01); *H01M 8/04044* (2013.01); *H01M 2250/20* (2013.01); *Y02E 60/50* (2013.01); *Y02T 90/32* (2013.01)

(58) Field of Classification Search
CPC ................... H01M 2250/20; H01M 8/04029; H01M 8/04044; Y02E 60/50; Y02T 90/32
See application file for complete search history.

(56) References Cited

U.S. PATENT DOCUMENTS

| | | | |
|---|---|---|---|
| 2007/0154758 A1* | 7/2007 | Kikuchi et al. | 429/26 |
| 2011/0086279 A1* | 4/2011 | Brinner et al. | 429/419 |
| 2011/0129753 A1* | 6/2011 | Na et al. | 429/437 |

FOREIGN PATENT DOCUMENTS

| | | |
|---|---|---|
| JP | 2007103336 A | 4/2007 |
| JP | 2007-296419 A | 11/2007 |
| JP | 2007335326 A | 12/2007 |
| JP | 2008103297 A | 5/2008 |
| JP | 2008210705 A | 9/2008 |
| KR | 10-1998-34942 | 9/1998 |
| KR | 10-0837957 | 6/2008 |

* cited by examiner

*Primary Examiner* — Patrick Ryan
*Assistant Examiner* — Ben Lewis
(74) *Attorney, Agent, or Firm* — Mintz Levin Cohn Ferris Glovsky and Popeo, P.C.; Peter F. Corless

(57) ABSTRACT

A cooling apparatus for a fuel cell is provided. The cooling apparatus for a fuel cell includes a reservoir that is configured to store a coolant and an ion filter assembly that is integrally installed at the reservoir and configured to remove bubbles in the coolant.

10 Claims, 4 Drawing Sheets

COOLING APPARATUS FOR FUEL CELL

CROSS-REFERENCE TO RELATED APPLICATION

This application claims priority to and the benefit of Korean Patent Application No. 10-2012-0126231 filed in the Korean Intellectual Property Office on Nov. 8, 2012, the entire contents of which are incorporated herein by reference.

BACKGROUND (a) Field of the Invention

An exemplary embodiment of the present invention relates to a heat and water management system of a fuel cell vehicle, and more particularly, to a cooling apparatus for a fuel cell, that cools heat generated in a fuel cell stack.

(b) Description of the Related Art

In general, a fuel cell system supplies hydrogen, which is used as fuel and air as an oxidant, to a fuel cell stack, and produces electricity through an electrochemical reaction between hydrogen and oxygen. The fuel cell system is mounted within a vehicle, and drives the vehicle by operating an electric motor with electricity produced by the fuel cell stack. The fuel cell system refers to a type of electric power generation system which does not convert chemical energy of fuel into heat by combustion, but electrochemically converts the chemical energy directly into electrical energy in the fuel cell stack.

Typically, the fuel cell stack obtains desired output power by laminating several tens to several hundreds of sheets of fuel cells including a unit configured by an membrane electrode assembly (MEA), a gasket, a separation plate, or the like. Since a substantial amount of heat is generated in the fuel cell stack in addition to a fuel cell reaction, a configuration of a cooling apparatus is necessary in the fuel cell system to reduce the generated heat. The cooling apparatus includes a coolant reservoir (hereinafter, referred to as "reservoir" for convenience) that stores a coolant, and a coolant pump that supplies the coolant stored in the coolant reservoir to the fuel cell stack.

Moreover, an antifreeze fluid is used in the fuel cell vehicle as a coolant. The coolant is injected into a cooling system (also typically called "stack cooling loop" in this field) of the fuel cell stack including the reservoir when the vehicle is manufactured. The coolant may be injected in a pressing manner after the cooling system is in a vacuum state to prevent bubbles from generating in the cooling system. When the bubbles (e.g., air) are present in the cooling system when the coolant is injected, a possibility of overheating due to a coolant deficiency is increased as the coolant overflows when driving the fuel cell vehicle.

In addition, when the bubbles are present in the cooling system of the fuel cell vehicle, as described above, deterioration in efficiency of the fuel cell and cooling performance due to a local increase in temperature of the fuel cell stack may occur, coolant flow noise may occur, and moreover adverse influence such as damage of the fuel cell may occur. Therefore, the fuel cell vehicle includes an ion filter that removes the bubbles from the cooling system. The ion filter is installed within the cooling system in an engine room separately from the reservoir.

The above information disclosed in this section is merely for enhancement of understanding of the background of the invention and therefore it may contain information that does not form the prior art that is already known in this country to a person of ordinary skill in the art.

SUMMARY

The present invention provides a cooling apparatus for a fuel cell in which a reservoir and an ion filter are integrated.

An exemplary embodiment of the present invention provides a cooling apparatus for a fuel cell that may include: a reservoir configured to store a coolant; and an ion filter assembly integrally installed at the reservoir and configured to remove bubbles in the coolant. In addition, in the cooling apparatus, the ion filter assembly may be installed to be attachable to and detachable from the reservoir. The ion filter assembly may be installed to be coupled to and separated from the reservoir as a cartridge type. Furthermore, in the cooling apparatus for a fuel cell according to the exemplary embodiment of the present invention, a handle may be disposed at an upper portion of the ion filter assembly. The handle may be engaged with the reservoir in a screw manner. In addition, in the cooling apparatus the reservoir may include a partition wall member by which a first space in which the ion filter assembly is installed and a second space connected to the first space may be partitioned. The partition wall member may form a passageway connected to the second space, between the partition wall member and an inner wall surface of the reservoir in the first space. The partition wall member may form positive pressure in the first space and negative pressure in the second space via the passageway and may be formed as a differential pressure wall.

The cooling apparatus for a fuel cell may also include a coolant injection port connected to the first space and a coolant discharge port connected to the second space at the reservoir. A coolant injection pipe may be installed at the reservoir and a cap that discharges air may be installed at the coolant injection pipe. In addition, a level gauge that indicates a level of the coolant and a drain plug that drains the coolant may be installed at the reservoir.

According to the exemplary embodiments of the present invention, since the ion filter assembly may be integrally configured with the reservoir, an available space in the engine room may be secured, manufacturing costs may be reduced, and a weight of the vehicle may be reduced. Also, since differential pressure may be formed in the reservoir by the partition wall member, the bubbles in the coolant circulating in the stack cooling loop may be smoothly removed, a time for removing the bubbles may be reduced, and maintainability of a vehicle for removing the bubbles may be improved.

In addition, in the exemplary embodiment of the present invention, since the bubbles in the coolant may be smoothly removed, heat radiating efficiency of the fuel cell stack may be increased, and a coolant flow noise due to the bubble in the coolant may be improved. Further, since the ion filter assembly may be a cartridge type, the ion filter assembly may be coupled to and separated from the reservoir, and the ion filter assembly may be replaced without using an additional tool. In addition, since the cap may be installed at the coolant injection pipe, the coolant may be prevented from leaking when the ion filter assembly is replaced.

BRIEF DESCRIPTION OF THE DRAWINGS

The drawings are provided for reference to explain an illustrative exemplary embodiment of the present invention, and the technical spirit of the present invention should not be interpreted to be limited to the accompanying drawings.

DETAILED DESCRIPTION

Figure 1:
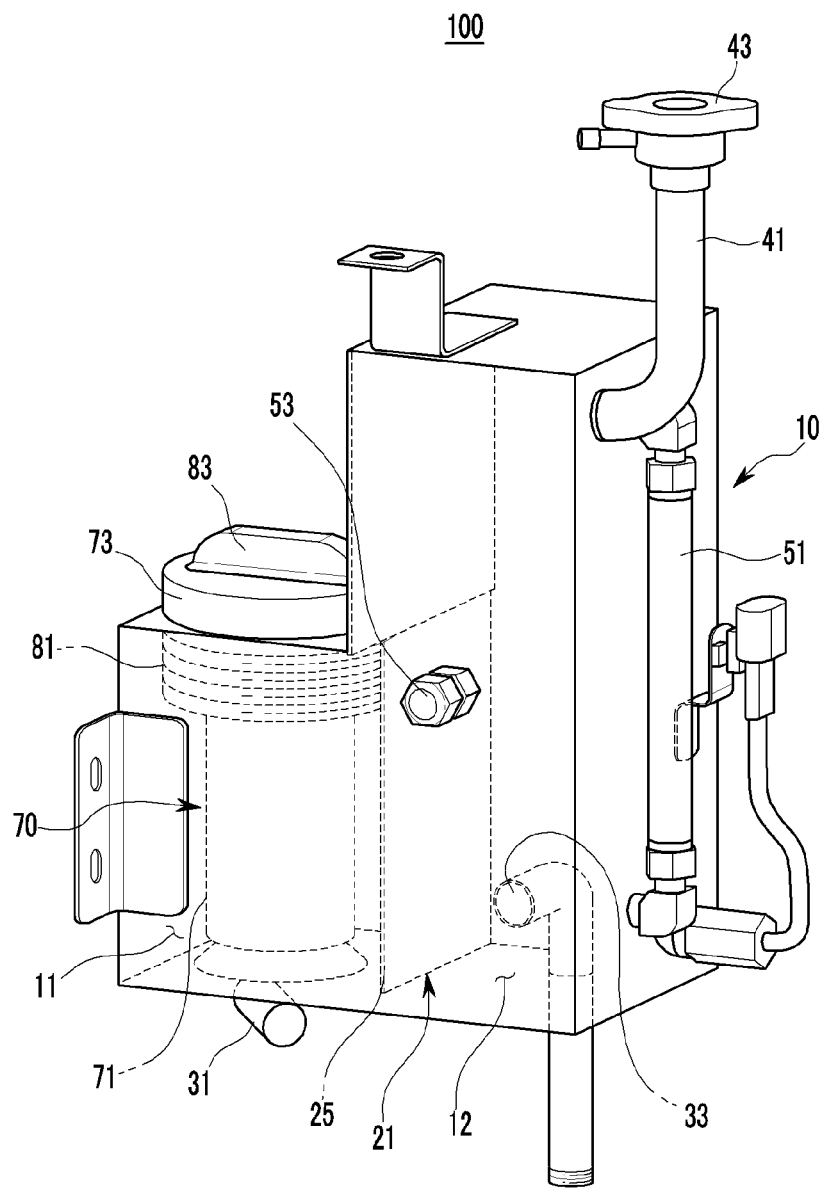
FIG. 1 is an exemplary front view illustrating a cooling apparatus for a fuel cell according to an exemplary embodiment of the present invention.

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles, and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

To clearly describe the present invention, parts that are irrelevant to the description are omitted. Like numerals refer to like or similar constituent elements throughout the specification. The size and the thickness of each component illustrated in the drawings are arbitrarily illustrated in the drawings for better understanding and ease of description, but the present invention is not limited to the illustration. In the drawings, the thicknesses of various portions and regions are enlarged for clarity.

Further, in the following detailed description, names of constituents, which are in the same relationship, are divided into "the first", "the second", and the like, but the present invention is not limited to the order in the following description. In addition, the terminology such as " . . . unit", " . . . means", " . . . part", or " . . . member", which is disclosed in the specification, refers to a unit of an inclusive constituent which performs at least one of the functions or operations.

Figure 2:
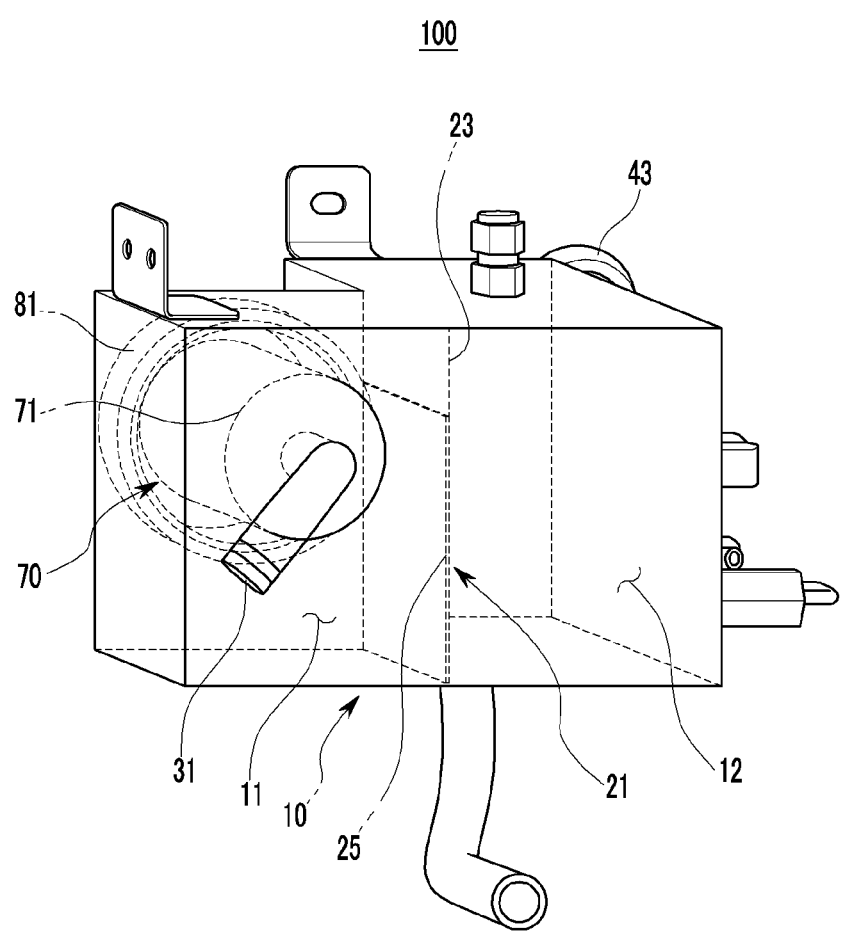
FIG. 2 is an exemplary bottom view illustrating a cooling apparatus for a fuel cell according to an exemplary embodiment of the present invention.
Figure 3:
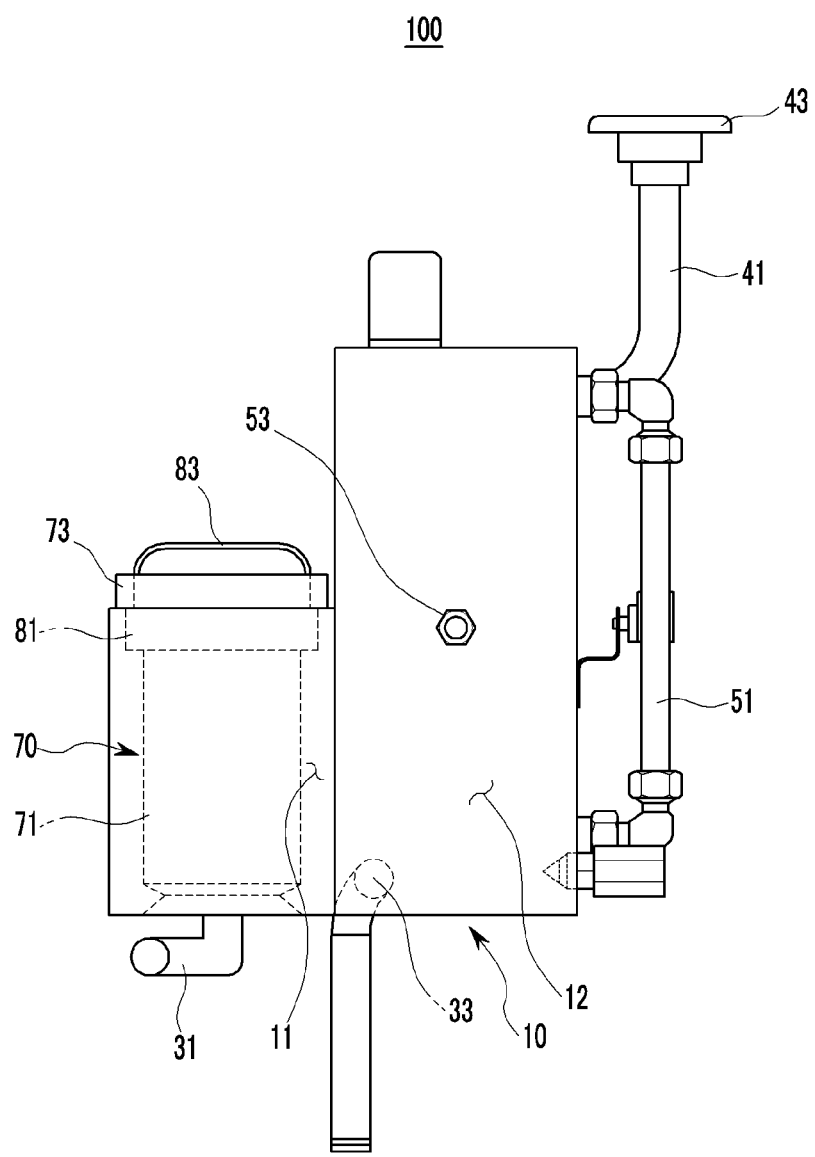
FIG. 3 is an exemplary front configuration view illustrating a cooling apparatus for a fuel cell according to an exemplary embodiment of the present invention.

FIGS. 1 and 2 are exemplary views illustrating a cooling apparatus for a fuel cell according to an exemplary embodiment of the present invention, and FIG. 3 is an exemplary front configuration view illustrating a cooling apparatus for a fuel cell according to an exemplary embodiment of the present invention.

Referring FIGS. 1 to 3, a cooling apparatus 100 for a fuel cell according to an exemplary embodiment of the present invention may be applied to a fuel cell system which produces electrical energy by an electrochemical reaction between fuel and an oxidant. For example, the fuel cell system may be applied to a fuel cell vehicle which drives an electric motor with electrical energy produced by an electrochemical reaction between fuel and oxidant.

In particular, the cooling apparatus 100 for a fuel cell may be configured to circulate a coolant to a stack cooling loop to cool heat generated in a fuel cell. The cooling apparatus 100 may remove bubbles substantially smoothly in the coolant which circulates in the stack cooling loop, may improve maintainability of a vehicle for removing the bubbles, and may secure an available space in an engine room (e.g., may be increase space availability in the engine room).

Furthermore, the cooling apparatus 100 for a fuel cell may include a reservoir 10 and an ion filter assembly 70, and the description for each component will be described below.

In the exemplary embodiment of the present invention, the reservoir 10 may be a tank that stores a coolant. The reservoir 10 may be a polyhedron having an inner space that accommodates the coolant, and may allow the coolant to be flowed in and out by a coolant pump (not illustrated).

The reservoir 10 may include a partition wall member 21 that partitions the inner space into a first space 11 and a second space 12. The partition wall member 21 having a panel shape may be installed to be connected to one inner wall surface of the reservoir 10 and spaced apart from the other inner wall surface of the reservoir 10. In other words, the partition wall member 21 may be connected to one inner wall surface of the reservoir 10 to partition the inner space into two spaces, and may form a passageway 23, that connects the first and second spaces 11 and 12, between the partition wall member and the other inner wall surface of the reservoir 10. The partition wall member 21 may be a differential pressure wall 25 that forms positive pressure in the first space 11 and negative pressure in the second space 12 via the passageway 23.

Moreover, a coolant injection port 31 connected to the first space 11 and a coolant discharge port 33 connected to the second space 12 may be disposed at the reservoir 10. A coolant injection pipe 41 that injects the coolant into the inner space may be installed at the reservoir 10. The coolant injection pipe 41 may be connected to the second space 12 at an upper side of the reservoir 10. In addition, a cap 43, which may be coupled to an injection end of the injection pipe 41 and may discharge air in the reservoir 10, may be installed at the coolant injection pipe 41.

Further, a level gauge 51, which may visually indicate a storage level of the coolant, may be installed at a side surface of the reservoir 10, that is, a side surface that corresponds to the second space 12. In addition, a drain plug 53 that drains the coolant may be installed at a front surface of the reservoir 10, that is, a front surface that corresponds to the second space 12.

The ion filter assembly 70 may be configured to remove the bubbles in the coolant. Additionally, the ion filter assembly 70 may be integrally installed at the reservoir 10. The ion filter assembly 70 may include a filter element 71 that removes the bubbles in the coolant. The ion filter assembly 70 may be installed to be attachable to and detachable from the reservoir 10. Further, the ion filter assembly 70 may be installed to be coupled to and separated from an upper surface of the reservoir 10, which corresponds to the first space 11, as a cartridge type. As discussed, the ion filter assembly 70 may be coupled to the reservoir 10 using various methods (e.g., an engagement aperture and a protrusion fitting the engagement apertures), and may be disposed in the first space 11 in the inner space of the reservoir 10.

A handle 83 that replaces the ion filter assembly 70 manually without using an additional tool may be formed at the upper surface of the reservoir 10 that corresponds to the first space 11. The handle 83 may be thread engaged with the reservoir 10. In particular, a coupling block 73 may be formed at the handle 83, and a coupling portion with which the coupling block 73 may be engaged may be formed at the upper surface of the reservoir 10 that corresponds to the first space 11.

Figure 4:
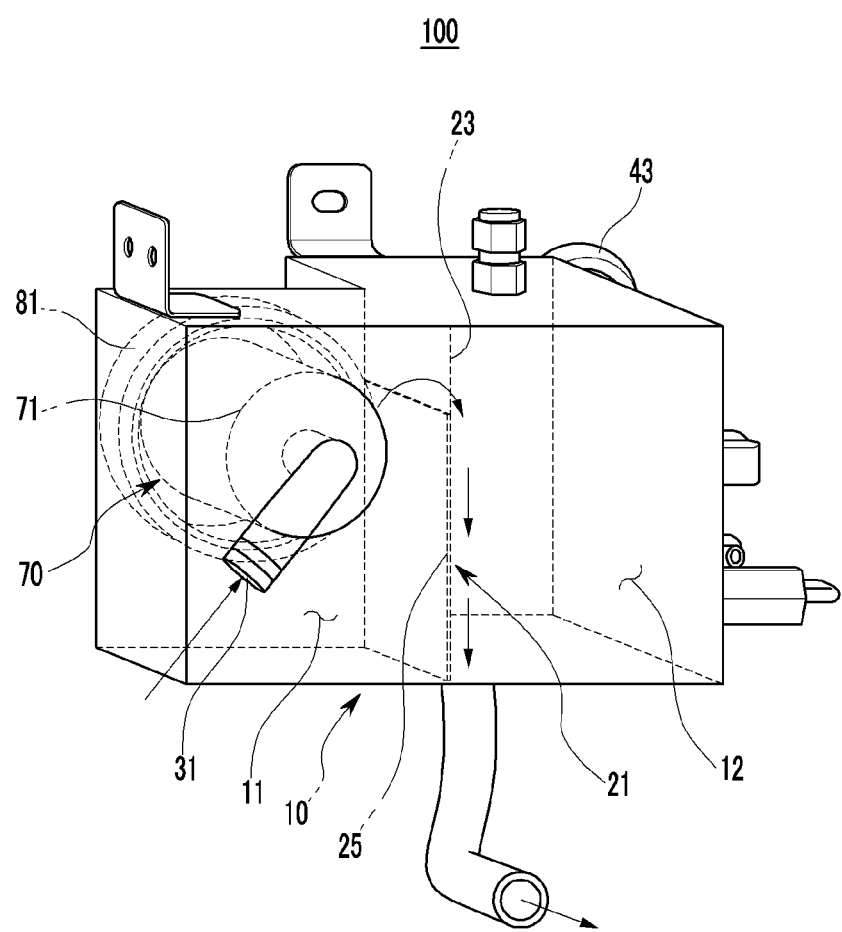
FIG. 4 is an exemplary view showing an operation of a cooling apparatus for a fuel cell according to an exemplary embodiment of the present invention.

Hereinafter, an operational effect of the cooling apparatus 100 for a fuel cell according to an exemplary embodiment of the present invention, which is configured as described above, will be described in detail with reference to the aforementioned drawings and the accompanying drawing. FIG. 4 is an exemplary view illustrating an operation of the cooling apparatus for a fuel cell according to an exemplary embodiment of the present invention.

Referring to FIG. 4 together with the aforementioned drawings, in the exemplary embodiment of the present invention, the coolant circulating in the stack cooling loop may flow into the first space 11 of the reservoir 10 via the coolant injection port 31. Then, the coolant may pass through the filter element 71 of the ion filter assembly 70 in the first space 11, and the bubbles in the coolant may be removed by the filter element 71. In particular, the ion filter assembly 70 as a cartridge type may be firmly held inside the first space 11 of the reservoir 10 by the coupling block 73 of the handle 83. The coolant in which the bubbles may be removed as described above may flow from the first space 11 of the reservoir 10 to the second space 12 via the passageway 23 between the partition wall member 21 and the other inner wall surface.

In the exemplary embodiment of the present invention, differential pressure of a flow of the coolant may be generated in the reservoir 10 by the partition wall member 21 during the aforementioned process. In other words, via the passageway 23 between the partition wall member 21 and the other inner wall surface, positive pressure may be formed in the first space 11, and negative pressure may be formed in the second space 12. Accordingly, the coolant flowing into the second space 12 of the reservoir 10 may be discharged via the coolant discharge port 33 by the negative pressure in the second space 12 without being discharged to the coolant injection pipe 41.

When a length of the partition wall member 21 is greater than a predetermined length (e.g., substantially long), since a width of the passageway 23 decreases, and a flow rate of the coolant becomes deficient due to a loss of pressure, the coolant may not be supplied to an object to be cooled at a necessary flow rate. Further, when the length of the partition wall member 21 is less than a predetermined length (e.g., substantially short), since the width of the passageway 23 increases, the coolant flowing into the first space 11 may be discharged to the coolant injection pipe 41 by pressure of the coolant pump without being discharged via the coolant discharge port 33. In particular, the length of the partition wall member 21 may be defined as a length from one inner wall surface of the reservoir 10 to the other inner wall surface. Since the length of the partition wall member 21 may be changed based on a volume of the reservoir 10, a volume of the fuel cell, or the like, the exemplary embodiment of the present invention is not limited to any specific value.

Moreover, the bubbles removed by the ion filter assembly 70 may flow into the coolant injection pipe 41 in the second space 12 of the reservoir 10, and may be discharged to the exterior of the cooling apparatus via the cap 43. Further, a level of the coolant stored in the reservoir 10 may be visually indicated through the level gauge 51, and the coolant in the reservoir 10 may be discharged by detaching the drain plug 53. When the ion filter assembly 70 needs to be replaced, the handle 83 may be removed from the reservoir 10 by being rotated in a loosening direction. Then, the ion filter assembly 70 may be easily separated from the reservoir 10 through an opening exposed by removing the handle 83.

In the exemplary embodiment of the present invention, which is described above, since the ion filter assembly 70 may be integrally configured with the reservoir 10, an available space in the engine room may be secured, manufacturing costs may be reduced, and a weight of the vehicle may be reduced. In addition, in the exemplary embodiment of the present invention, since differential pressure may be formed in the reservoir 10 by the partition wall member 21, the bubbles in the coolant circulating in the stack cooling loop may be smoothly removed, a time for removing the bubbles may be reduced, and maintainability of a vehicle for removing the bubbles may be improved.

Furthermore, in the exemplary embodiment of the present invention, since the bubbles in the coolant may be smoothly removed, heat radiating efficiency of the fuel cell stack may be increased, and a coolant flow noise due to the bubble in the coolant may be improved. Since the ion filter assembly 70 may be a cartridge type, the ion filter assembly 70 may be coupled to and separated from the reservoir 10, and the ion filter assembly 70 may be replaced without using an additional tool. In addition, since the cap 43 that discharges air may be installed at the coolant injection pipe 41, the coolant may be prevented from leaking when the ion filter assembly 70 is replaced.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

DESCRIPTION OF SYMBOLS

| 10 | Reservoir | 11 | First space |
|---|---|---|---|
| 12 | Second space | 21 | Partition wall member |
| 23 | Passageway | 25 | Differential pressure wall |
| 31 | Coolant injection port | 33 | Coolant discharge port |
| 41 | Coolant injection pipe | 43 | Cap |
| 51 | Level gauge | 53 | Drain plug |
| 70 | Ion filter assembly | 71 | Filter element |
| 73 | Coupling block | 81 | Coupling portion |
| 83 | Handle | | |

What is claimed is:

1. A cooling apparatus for a fuel cell, comprising:
    a reservoir configured to store a coolant; and
    an ion filter assembly integrally installed at the reservoir and configured to remove bubbles in the coolant,
    wherein the reservoir includes a partition wall member by which a first space in which the ion filter assembly is installed and a second space connected to the first space are partitioned, wherein the partition wall member, forms a passageway, which is connected to the second space, between the partition wall member and an inner wall surface of the reservoir in the first space, and wherein the partition wall member and the passageway cause positive pressure in the first space and negative pressure in the second space.

2. The cooling apparatus of claim 1, wherein the ion filter assembly is installed to be attachable to and detachable from the reservoir.

3. The cooling apparatus of claim 2, wherein the ion filter assembly is installed to be coupled to and separated from the reservoir as a cartridge type.

4. The cooling apparatus of claim 3, further comprising:
a handle disposed at an upper portion of the ion filter assembly.

5. The cooling apparatus of claim 4, wherein the handle is thread-coupled with the reservoir.

6. The cooling apparatus of claim 1, wherein the partition wall member is a differential pressure wall.

7. The cooling apparatus of claim 1, further comprising:
a coolant injection port connected to the first space and a coolant discharge port connected to the second space disposed at the reservoir.

8. The cooling apparatus of claim 1, further comprising:
a coolant injection pipe installed at the reservoir; and
a cap installed at the coolant injection pipe to discharge air.

9. The cooling apparatus of claim 1, further comprising:
a level gauge that indicates a level of the coolant is installed at the reservoir.

10. The cooling apparatus of claim 1, further comprising:
a drain plug that drains the coolant is installed at the reservoir.

* * * * *